United States Patent
Johnson et al.

(10) Patent No.: US 10,854,029 B2
(45) Date of Patent: Dec. 1, 2020

(54) DECENTRALIZED VIRTUAL TRUSTLESS DATABASE FOR ACCESS CONTROL

(71) Applicant: Live Nation Entertainment, Inc., Beverly Hills, CA (US)

(72) Inventors: David Johnson, San Marino, CA (US); Joseph Mulkey, Los Angeles, CA (US)

(*) Notice: Subject to any disclaimer, the term of this patent is extended or adjusted under 35 U.S.C. 154(b) by 0 days.

(21) Appl. No.: 16/579,061

(22) Filed: Sep. 23, 2019

(65) Prior Publication Data
US 2020/0090433 A1    Mar. 19, 2020

Related U.S. Application Data

(63) Continuation of application No. 15/700,563, filed on Sep. 11, 2017, now Pat. No. 10,424,140, which is a continuation of application No. 15/423,452, filed on Feb. 2, 2017, now Pat. No. 9,792,742.

(60) Provisional application No. 62/290,158, filed on Feb. 2, 2016.

(51) Int. Cl.
| | |
|---|---|
| G07C 9/00 | (2020.01) |
| G06Q 10/02 | (2012.01) |
| G06Q 20/04 | (2012.01) |
| G07C 9/25 | (2020.01) |
| G06Q 20/06 | (2012.01) |
| H04L 9/06 | (2006.01) |

(52) U.S. Cl.
CPC ........... *G07C 9/257* (2020.01); *G06Q 10/02* (2013.01); *G06Q 20/045* (2013.01); *G06F 2221/2111* (2013.01); *G06Q 20/065* (2013.01); *H04L 9/0637* (2013.01)

(58) Field of Classification Search
CPC ............. G07C 9/257; G07C 9/00087; G06F 2221/2111; G06Q 20/065; G06Q 10/02; G06Q 20/045; H04L 9/0637

USPC ................................................. 340/5.61, 4.6
See application file for complete search history.

(56) References Cited

U.S. PATENT DOCUMENTS

| | | | | |
|---|---|---|---|---|
| 9,792,742 B2 * | 10/2017 | Johnson | ................ | G06Q 10/02 |
| 10,424,140 B2 * | 9/2019 | Johnson | ................ | G06Q 10/02 |
| 2003/0229790 A1 | 12/2003 | Russell | | |
| 2008/0154623 A1 * | 6/2008 | Derker | ................ | G06Q 10/087 |
| | | | | 705/1.1 |
| 2012/0078667 A1 * | 3/2012 | Denker | ................ | G06Q 10/02 |
| | | | | 705/5 |
| 2012/0078687 A1 | 3/2012 | Ghosh et al. | | |

(Continued)

FOREIGN PATENT DOCUMENTS

WO    2017136579 A1    8/2017

OTHER PUBLICATIONS

U.S. Appl. No. 15/423,452 received a First Action Interview Pilot Program Pre-Interview Communication dated Apr. 14, 2017, 4 pages.
U.S. Appl. No. 15/423,452 received a Notice of Allowance dated Jun. 9, 2017, 14 pages.
U.S. Appl. No. 15/700,563 received a Non-Final Office Action dated Jul. 12, 2018, 12 pages.

(Continued)

*Primary Examiner* — Edwin C Holloway, III
(74) *Attorney, Agent, or Firm* — Kilpatrick Townsend & Stockton

(57) ABSTRACT

Described are systems and techniques for leveraging a virtual distributed trustless database using access-enabling codes. The computations use private codes. Each computation includes the information from all previous computations so that a chain of computations is maintained and controlled. A central system insures that dual computations do not occur.

20 Claims, 9 Drawing Sheets

(56) References Cited

U.S. PATENT DOCUMENTS

| | | | |
|---|---|---|---|
| 2012/0280783 A1* | 11/2012 | Gerhardt | G07C 9/00309 |
| | | | 340/5.6 |
| 2013/0166398 A1 | 6/2013 | Minde | |
| 2015/0278820 A1* | 10/2015 | Meadows | G06Q 20/40145 |
| | | | 705/64 |
| 2015/0319158 A1 | 11/2015 | Kumnick | |
| 2015/0356524 A1 | 12/2015 | Pennanen | |
| 2016/0005012 A1 | 1/2016 | Goetz et al. | |
| 2016/0006744 A1 | 1/2016 | Du et al. | |
| 2016/0086175 A1 | 3/2016 | Finlow-Bates | |
| 2016/0098723 A1 | 4/2016 | Feeney | |
| 2017/0213210 A1 | 7/2017 | Kravitz | |

OTHER PUBLICATIONS

U.S. Appl. No. 15/700,563 received a Notice of Allowance dated May 15, 2019, 5 pages.

PCT/US2017/016258 received an International Preliminary Report on Patentability, dated Aug. 16, 2018, 9 pages.

PCT/US2017/016258 received an International Search Report and Written Opinion dated Jul. 21, 2017, 13 pages.

Nakamoto; Satoshi, "Bitcoin: A Peer-to Peer Electronic Cash System", Oct. 31, 2008, XP055131503, URL:https://bitcoin.orgjbitcoin.pdf [retrieved on Jul. 24, 2014], pp. 1-9.

Van Valkenburgh; Peter, "Framework for Securities Regulation of Cryptocurrencies", Coin Center Report, Jan. 31, 2016, URL:https://pdfs.semanticscholar.org/4f7c/808186fb6bbc7c72ffe11869e10914441a88.pdf [retrieved on Jul. 22, 2017] p. 7-8, p. 26, referenced, all pages downloaded.

* cited by examiner

DECENTRALIZED VIRTUAL TRUSTLESS DATABASE FOR ACCESS CONTROL

CROSS-REFERENCE TO RELATED APPLICATIONS

This application is a continuation of U.S. patent application Ser. No. 15/700,563 filed Sep. 11, 2017, which is a continuation of U.S. patent application Ser. No. 15/423,452 filed Feb. 2, 2017, now U.S. Pat. No. 9,792,742 issued Oct. 17, 2019, and claims the benefit of priority to U.S. Provisional Patent Application No. 62/290,158, filed Feb. 2, 2016, the entire contents of each of which are herein incorporated by reference in their entirety for all purposes.

The present application is related to the following co-pending and commonly assigned PCT Application No. PCT/US17/16258 (Attorney Docket Number 095001-1038017 (005310PC)) filed Feb. 2, 2017, the entire contents of which are incorporated by reference herein.

FIELD

The present disclosure is related to access control and use of a distributed trustless database for facilitating access to resources.

BACKGROUND

Access control systems provide the ability to restrict entry to resources, such as restricted-access areas, zones, buildings, etc. For example, restrictions may be user based, time based, location based, etc.

SUMMARY

One embodiment described herein is a distributed virtual trustless database based access control system for controlling access to restricted access areas with a processor based resource access coordinator that performs actions of: defining specifications for a resource, wherein the resource is related to a restricted access area; allocating access rights for the resource based on the specifications; linking the access rights for the resource to a first trustless database computation; and publishing the access rights for the resource. The processor based resource access coordinator also performs actions of using a second trustless database computation, wherein the second trustless database computation includes information from the first trustless database computation, and accomplishes: assigning the access rights for the resource to a requestor; and generating access-enabling codes for the access rights for the requestor using a private code. The processor based resource access coordinator also performs the action of granting access to the restricted access area upon presentation of the access-enabling codes. In this embodiment one or more servers that perform the actions of: receiving a request for the access rights for the resource from a requester device; receiving the private code from the requester device; transmitting a confirmation of assignment for the access rights to the requester device; and transmitting the access-enabling codes to the requester device. In a variation of this embodiment the private code is based in part on a requestor's signature or digital biometric information including facial image, fingerprint, or retina scan. In an extended variation of this embodiment the digital biometric information includes facial image, fingerprint, voice print or, retina scan. In yet another extension of this embodiment a centralized access-enabling code verification system limits access to the restricted area to a single access-enabling codes holder. And yet a further extension of this embodiment the distributed virtual trustless database uses colored bitcoin, access tokens, or access token identifiers. In yet another variation of this embodiment the processor based resource access coordinator further performs actions of: using a third trustless database computation, wherein the third trustless database computation includes information from the second trustless database computation: assigning the access rights for the resource to a second requestor; and generating second access-enabling codes for the access rights for the second requestor using a second private code; and granting access to the restricted access area upon presentation of the second access-enabling codes. And in extension of the immediate variation is that the second private code is based in part on a second requestor's signature or digital biometric information.

Yet a second embodiment described herein is a processor based distributed virtual trustless database based access control method for controlling access to restricted access areas comprising: defining specifications for a resource, wherein the resource is related to a restricted access area; allocating access rights for the resource based on the specifications; linking the access rights for the resource to a first trustless database computation; and publishing the access rights for the resource; This embodiment also uses a second trustless database computation, wherein the second trustless database computation includes information from the first trustless database computation, and accomplishes: assigning the access rights for the resource to a requestor; and generating access-enabling codes for the access rights for the requestor using a private code. This embodiment further entails: granting access to the restricted access area upon presentation of the access-enabling codes; receiving a request for the access rights for the resource from a requester device; receiving the private code from the requester device; transmitting a confirmation of assignment for the access rights to the requester device; and transmitting the access-enabling codes to the requester device. In a variation of this embodiment the private code is based in part on a requestor's signature or digital biometric information including facial image, fingerprint, or retina scan. In an extended variation of this embodiment the digital biometric information includes facial image, fingerprint, voice print or, retina scan. In yet another extension of this embodiment a centralized access-enabling code verification system limits access to the restricted area to a single access-enabling codes holder. And yet a further extension of this embodiment the distributed virtual trustless database uses colored bitcoin, access tokens, or access token identifiers. In yet another variation of this embodiment the processor based resource access coordinator further performs actions of: using a third trustless database computation, wherein the third trustless database computation includes information from the second trustless database computation: assigning the access rights for the resource to a second requestor; and generating second access-enabling codes for the access rights for the second requestor using a second private code; and granting access to the restricted access area upon presentation of the second access-enabling codes. And in extension of the immediate variation is that the second private code is based in part on a second requestor's signature or digital biometric information.

In a third embodiment described herein is a non-transitory computer-readable medium having sets of instructions stored thereon for a distributed virtual trustless database based access control for controlling access to restricted access areas, that when executed by a computer, cause the computer to perform actions including: defining specifications for a resource, wherein the resource is related to a restricted access area; allocating access rights for the resource based on the specifications; linking the access rights for the resource to a first trustless database computation; and publishing the access rights for the resource; This embodiment also uses a second trustless database computation, wherein the second trustless database computation includes information from the first trustless database computation, and accomplishes: assigning the access rights for the resource to a requestor; and generating access-enabling codes for the access rights for the requestor using a private code. This embodiment further entails: granting access to the restricted access area upon presentation of the access-enabling codes; receiving a request for the access rights for the resource from a requester device; receiving the private code from the requester device; transmitting a confirmation of assignment for the access rights to the requester device; and transmitting the access-enabling codes to the requester device. In a variation of this embodiment the private code is based in part on a requestor's signature or digital biometric information including facial image, fingerprint, or retina scan. In an extended variation of this embodiment the digital biometric information includes facial image, fingerprint, voice print or, retina scan. In yet another extension of this embodiment a centralized access-enabling code verification system limits access to the restricted area to a single access-enabling codes holder. And yet a further extension of this embodiment the distributed virtual trustless database uses colored bitcoin, access tokens, or access token identifiers. In yet another variation of this embodiment the processor based resource access coordinator further performs actions of: using a third trustless database computation, wherein the third trustless database computation includes information from the second trustless database computation: assigning the access rights for the resource to a second requestor; and generating second access-enabling codes for the access rights for the second requestor using a second private code; and granting access to the restricted access area upon presentation of the second access-enabling codes. And in extension of the immediate variation is that the second private code is based in part on a second requestor's signature or digital biometric information.

BRIEF DESCRIPTION OF THE DRAWINGS

The present disclosure is described in conjunction with the appended figures.

Figure 1:
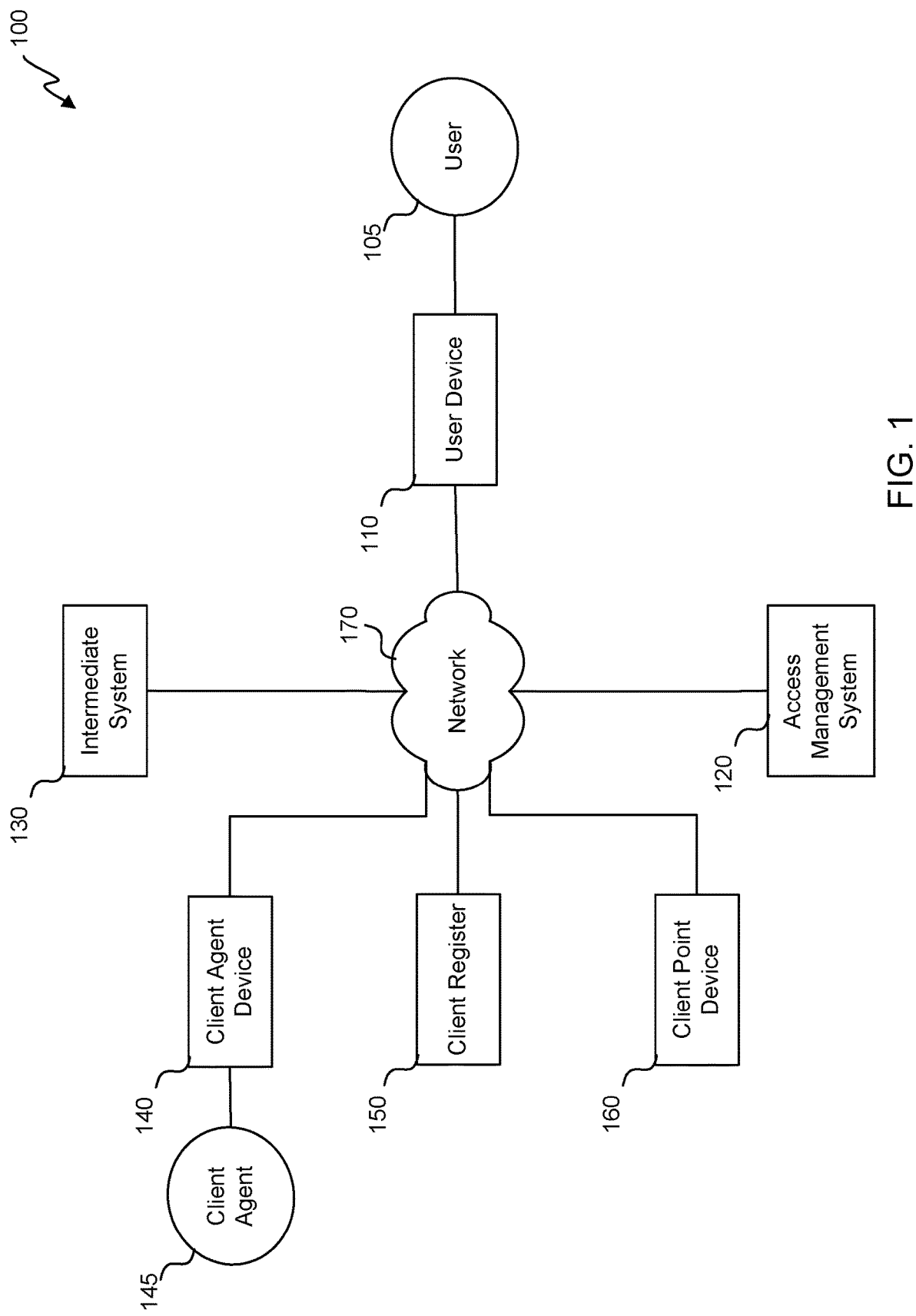
FIG. 1 depicts a block diagram of an embodiment of a resource access-facilitating interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Traditional access control systems typically require a great deal of infrastructure. For example, access control devices, such as a turnstile, gate or lockable door may be required at each entry point to a restricted access area. These access control devices may need to be in data communication with a computing device that checks the validity of access-enabling codes. Access-enabling codes may be stored on a user device, such as a radio frequency identifier (RFID) key fob, access control token, or other device such a smart phone, tablet computer, or other portable processing device. Optionally, individual computing devices can be used to verify the validity of access-enabling codes at each access control point. In some embodiments, however, the individual computing devices must be in data communication with a centralized access control server to verify access-enabling codes.

Optionally, a centralized server may maintain a list of valid access-enabling codes and propagate copies of the list or changes to the list to the individual devices at the various access control points. Such a system, however, still requires that a master list be maintained, whether by one device or distributed amongst several devices. The master list may indicate validity times and locations for individual access-enabling codes or groups of access-enabling codes. The master list, however, may change as access-enabling codes are added or removed from the list or as access rights change. In restricted access areas where access rights for many users change frequently, maintenance of the list may prove difficult, particularly if changes are to be propagated to a variety of access control devices.

In addition, as physical access control tokens are transferred between authorized users, are lost or stolen, or are sold to external parties for other uses, access-enabling codes associated with the access control tokens may need to be revoked, revised, or replaced, such as to maintain control over restricted access areas to ensure that only authorized users have access to the restricted access area. A centralized list of access-enabling codes associated with the access control tokens may be updated to permit tracking valid access control tokens, and optionally the associated users, and identification of access control tokens which may be lost, stolen, sold, or otherwise no longer valid or authorized for use to access the restricted access area. Again, in restricted access areas where access rights for many users change frequently, maintenance of the list may prove difficult, particularly if changes are to be propagated to a variety of access control devices.

The present invention solves these and other problems by making use of a virtual database or database that tracks transfers of data elements, such as access-enabling codes, and/or access control devices, which may be associated with access-enabling codes, from one user to another, or to identify devices or data elements that are lost, stolen, or sold. The database may advantageously be maintained in a distributed fashion such that multiple copies of the database are stored by various servers and can be verified against one another. This avoids the need to maintain a single, centralized copy of the database, though, in embodiments, this still may be useful. In this way, the distributed database may be decentralized and trustless in that no central actor is in control of the full database.

Trustless databases, such as those used by bitcoin can also be used to exchange non-currency resources by using "colored" bitcoins layered on top of bitcoin computations. A colored bitcoin, access token, or access token identifier ties a resource to a bitcoin computation or other trustless database computation so that the transfer and ownership of the resource can be traced through the block chain of the trustless database computation. A resource can be an access right to a restricted area, for instance, it can be a right to seat 34 in row 29 of a concert. Further, the trustless database computations are secured by using public and private codes so that access cannot be easily lost or stolen by the rightful holder of the access. Thus—the trustless database is way for resource providers to provide access rights to resources safely and securely and to protect against lost or stolen access rights.

Other problems, however, may arise from the use of a decentralized or distributed virtual trustless database that tracks valid access rights. Duplication and simultaneous use of an access-enabling code at multiple access control points may be problematic when a decentralized virtual trustless database is used. Combination of a decentralized database and a centralized access-enabling code verification system provides one technique for overcoming this and other issues.

Referring first to FIG. 1, a block diagram of an embodiment of a resource access-facilitating interaction system 100 is shown. A user device 110 (which can be operated by a user 105) can communicate with an access management system 120 directly or via another system (e.g., via an intermediate system 130). User device 110 can also communicate with one or more client devices, such as a client agent device 140 operated by a client agent 145, a client register 150 or a client point device 160. Each inter-system communication can occur over one or more networks 170 and can facilitate transmission of a variety of types of data. It will be understood that, although only one of various systems, devices, entities and network are shown, interaction system 100 can be extended to include multiple of any given system(s), device(s), entity(ies), and/or networks.

Access management system 120 can be configured to manage a set of access rights to one or more resources. More specifically, access management system 120 can track which resources are to be made available to users, specifications of the resources and times at which they will be available. Access management system 120 can also allocate access rights for resources and facilitate transmissions of notifications of the available rights to a set of user devices. For example, access management system 120 can alert users of the availability via a website, app page or email. As another example, access management system can transmit data about access rights and resources to one or more intermediate systems 130, which can facilitate distribution of access-right availability and processing of requests for such rights.

Thus, for a given resource, a plurality of access rights can be allocated. Each of the plurality of access rights can be configured to be assigned to a user or user device. Upon a presentation of an access-enabling code or other feature corresponding to the access right, a validity of the code or feature can be assessed to confirm that the access right was allocated and assigned (e.g., to a particular user or user device). Determining that the code or feature is valid can indicate that the user is to be permitted to access the resource. In some instances, an access characteristic of the access permitted by each access right in the plurality of access rights is unique across the plurality of access rights. For example, each access right can be configured to permit that an assigned user occupy a particular position while accessing the resource, and the particular positions can be unique across the plurality of access rights for a given resource.

Notifications of available access rights can be accompanied by options to request that one or more access rights be assigned to a user. Therefore, user 105 can provide input to user device 110 via an interface to request such assignment and provide other pertinent information. A request can be associated with one or more constraints, which may be specified via user input and/or identified based on a context in which a request was received (e.g., an access-right characteristic represented in a notification presented at a time or before (e.g., immediately before) request input was received. A constraint can identify a value or a range (e.g., a closed range or open-ended range) of a value of each of one or more characteristics of access rights. For example, a constraint can include a spatial constraint (e.g., identifying one or more sections or zones), a time constraint (e.g., identifying a date), or a price constraint. In some instances, a request includes one for access to a particular resource. In some instances, a request includes one including one or more constraints for selecting a resource (e.g., a resource location, involved entity, etc.). A request communication can be generated and transmitted from user device 110 to intermediate system 130 and/or access management system 120. The request communication can identify a resource and/or one or more constraints. The request communication can correspond to an indication that access-right identifications are being requested.

Intermediate system 130 and/or access management system 120 can process the request to query a data store to identify one or more access rights that correspond to the request. For example, each access right allocated for a resource can be associated with one or more characteristics (e.g., specifying an access time, access location, access level, and/or price). The query can identify a query result that identifies access rights associated with characteristics that match and/or are within a range of each of one or more constraints of a request.

Part of all of the query result can be identified within a request response. A notification can be generated, transmitted to and/or presented at a user device that identifies access rights (and/or characteristics thereof) in the request response. In some instances, intermediate system 130 and/or access management system 120 facilitate placing the identified access rights on hold for a defined (absolute, relative and/or functional) time period. In some instances, a hold need not be initiated.

In some instances, one or more communications can be exchanged between user device 110 and intermediate system 130 and/or access management system 120. Such communications can, for example, identify an incomplete subset of access rights identified in a notification requested for assignment, identify types of required information, identify values of required information, authorize payment, and so on. Upon receiving (e.g., and, in some instances, verifying) required information, intermediate system 130 and/or access management system 120 can assign one or more access rights to the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at user device 110 confirming the assignment and/or including data required for corresponding access to be permitted.

In some instances, a resource is at least partly controlled, offered or availed by a client. The resource may be offered at a particular location or structure, and a variety of client devices may be present at the location so as to facilitate usage of an access right and other offerings. Exemplary client devices can include client agent device 140, which can be one operated by a client agent (e.g., a human client agent), a client register 150 (e.g., which can operate independently of an agent and/or can be connected to or include a device that, while in a locked mode, can impede resource access, such as a turnstile) and client point device 160 (e.g., which can operate independently of an agent and/or can be positioned at or around the resource-associated location. For example, in some instances client agent device 140 can be operated by an agent at a location for a resource that is an event ("event resource") taking place at the location. In this example, client agent device 140 is used by an agent that is manning an entrance to the location (e.g., which can include, for example, a location of a structure or a geographic region) or a part thereof; client register 150 can be or can be connected to a turnstile, gate or lockable door that is positioned along a perimeter or entrance to a resource-associated location or part thereof; and client point device 160 can be an electronic device positioned at or within a resource-associated location.

In some instances, user device 105 performs particular functions upon detecting a client device and/or the contrary. For example, user device 110 may locally retrieve or request (e.g., from an external source) an access-enabling code. The access-enabling code can be transmitted to the client device or a remote server (e.g., a server hosting access management system 120) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as user device 110.

In some instances, user 105 can use multiple user devices 110 to perform various operations (e.g., using one device to request an access right and another to interact with client devices). Some instances of user device 110, access management system 120, intermediate system 130, client agent device 140, client register 150 and/or client point device 160 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 120. For example, a database or data store include a list of identifiers for each user or user device having an assigned access right for a resource or associating an identifier for each user or user device with an identifier of a particular access right. In some instances, an indicia can be transmitted to a user device that indicates that an access right is availed. In various instances, it may permitted or prohibited for the indicia to be transferred. The indicia may be provided as part of an electronic or physical object (e.g., a ticket) or independently. The indicia may include an access-enabling code.

In some instances, access management system 120 communicates with one or more intermediate systems 130, each of which may be controlled by a different entity as compared to an entity controlling access management system 120. For example, access management system 120 may assign access rights to an intermediate systems 130 (e.g., upon payment of a fee or upon acceptance of terms to conditionally pay a fee). Intermediate system 130 can then collect data pertaining to the assigned access rights and/or a corresponding event, can format and/or edit the data, generate a notification of availability of the access rights that includes the formatted and/or edited data and facilitate presentation of the notification at a user device 110. When intermediate system 130 receives a communication from a user device 110 indicative of an access-right request, intermediate system 130 can facilitate assignment (or reassignment) of an access right to the user (e.g., by transmitting relevant information to access management system 120 identifying the user and/or user device and/or by transmitting relevant information to user device 110 pertaining to the access right).

A resource can include one managed or provided by a client, such as a performing entity or an entity operating a venue. A user device 110 can transmit data corresponding to the access right (e.g., an access-enabling code) to a client device upon, for example, detecting the client device, detecting that a location of the user device 110 is within a prescribed geographical region, or detecting particular input. The receiving client device may include, for example, a client agent device 145 operated at an entrance of a defined geographical location or a client register 150 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on user device 110 is, at least in part, complementary to at least part of one on access management system 120 and/or a client device; and/or such that a software agent or app on intermediate system 130 is, at least in part, complementary to at least part of one on access management system 120).

In some instances, a network in the one or more networks 170 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 170 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or computational details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XX-TEA), and/or RC5, etc.

It will be appreciated that, while a variety of devices and systems are shown in FIG. 1, in some instances, resource access-facilitating interaction system 100 can include fewer devices and/or systems. Further, some systems and/or devices can be combined. For example, a client agent device 140 may also serve as an access management system 120 or intermediate system 130 so as to as to facilitate assignment of access rights.

As described in further detail herein, an interaction between user device 110 and a client device (e.g., client agent device 140, client register 150 or client point device 160) can facilitate, for example, verification that user 105 has a valid and applicable access right, obtaining an assignment of an access right, and/or obtaining an assignment of an upgraded access right.

Figure 2:
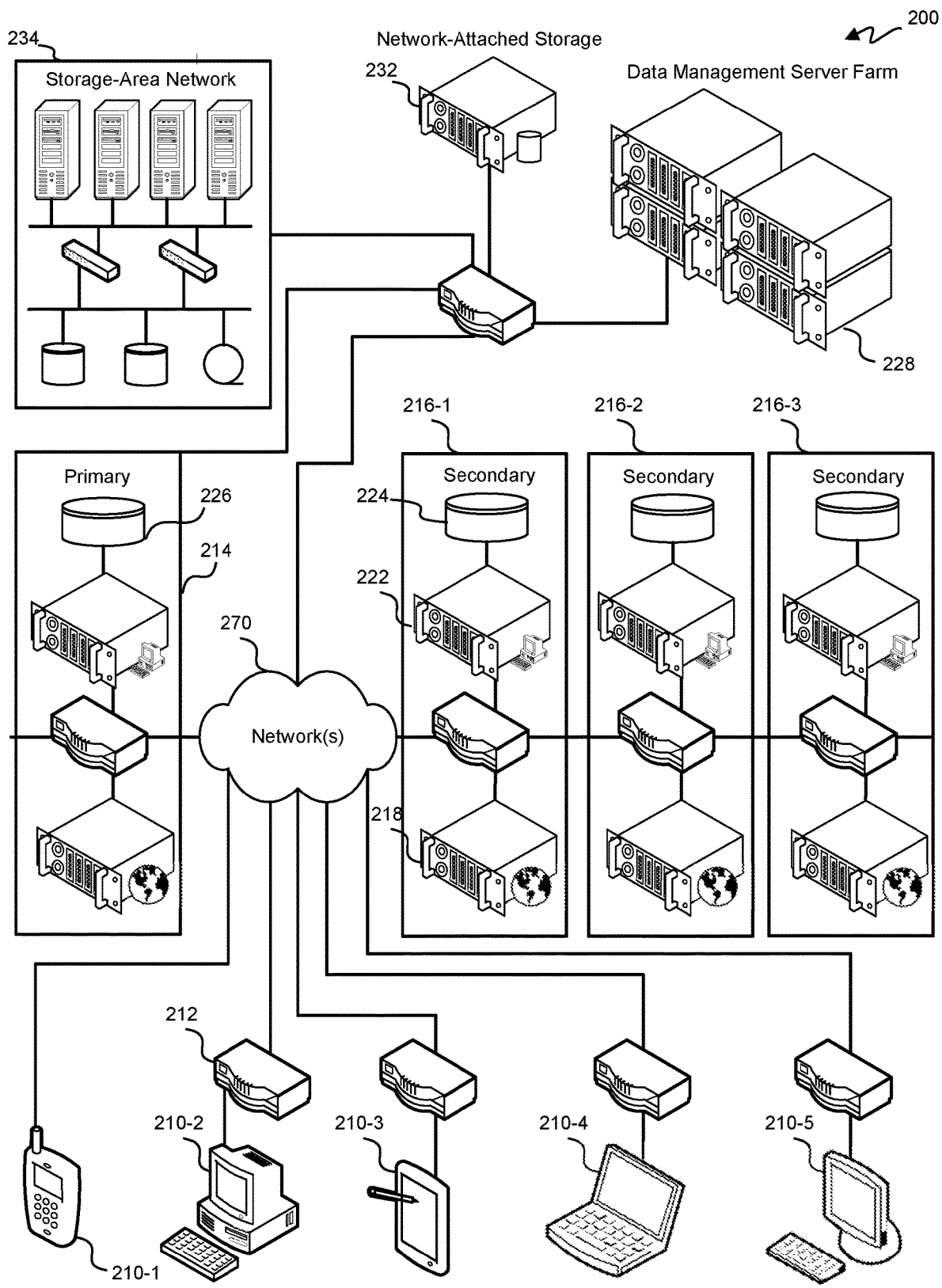
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access rights. Secondary assignment management system 216 can be configured to coordinate and/or control reassignment and/or transfer of access rights (e.g., from one user or user device to another or from an intermediate agent to a user or user device). Such transfer may occur as a result of a sale or fee payment. Secondary assignment management system 216 may also manage transfer offers (e.g., to allow a first user to identify a price at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights, including payment information, and so on), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
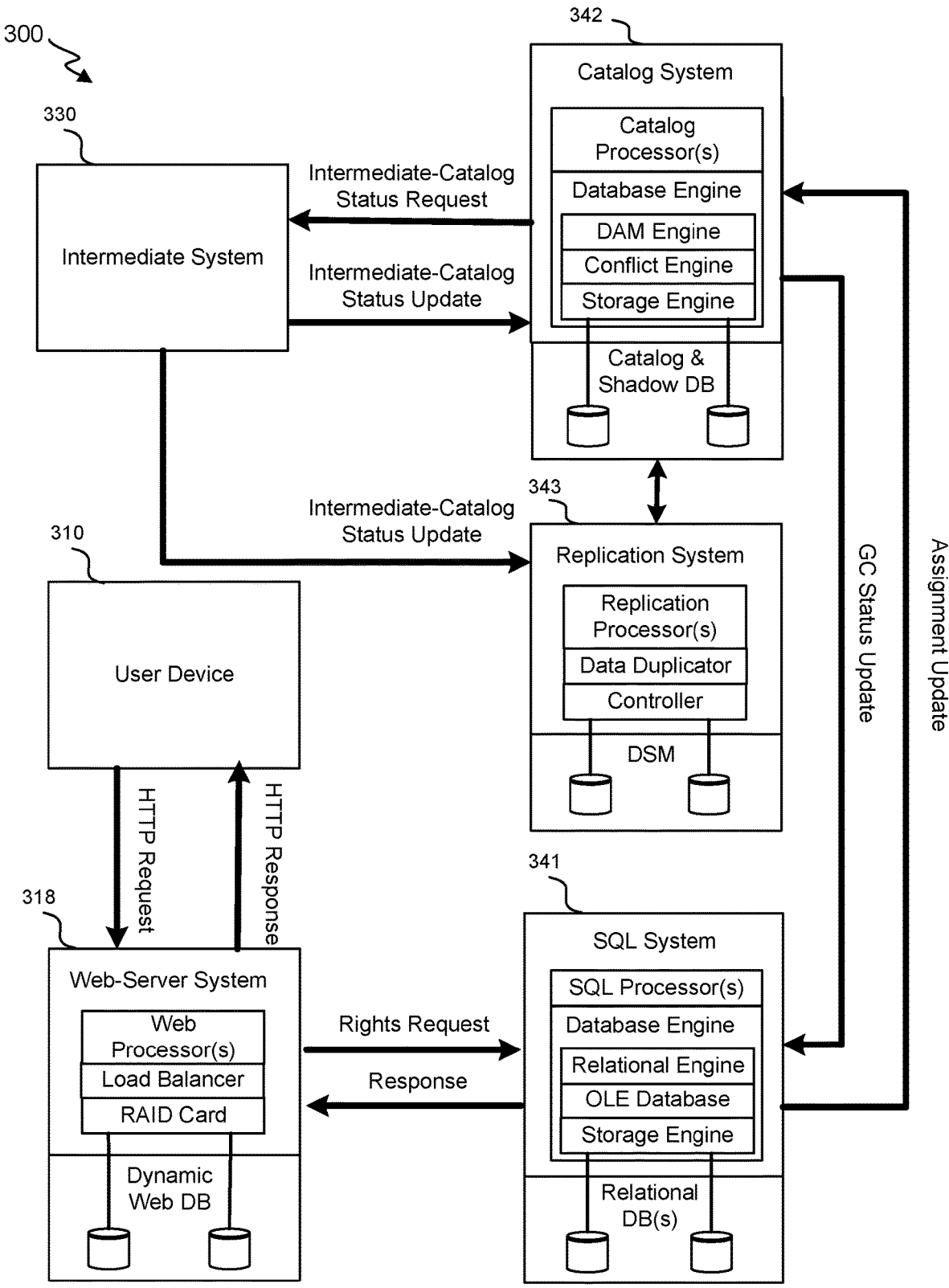
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information.

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be earmarked so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic web-pages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
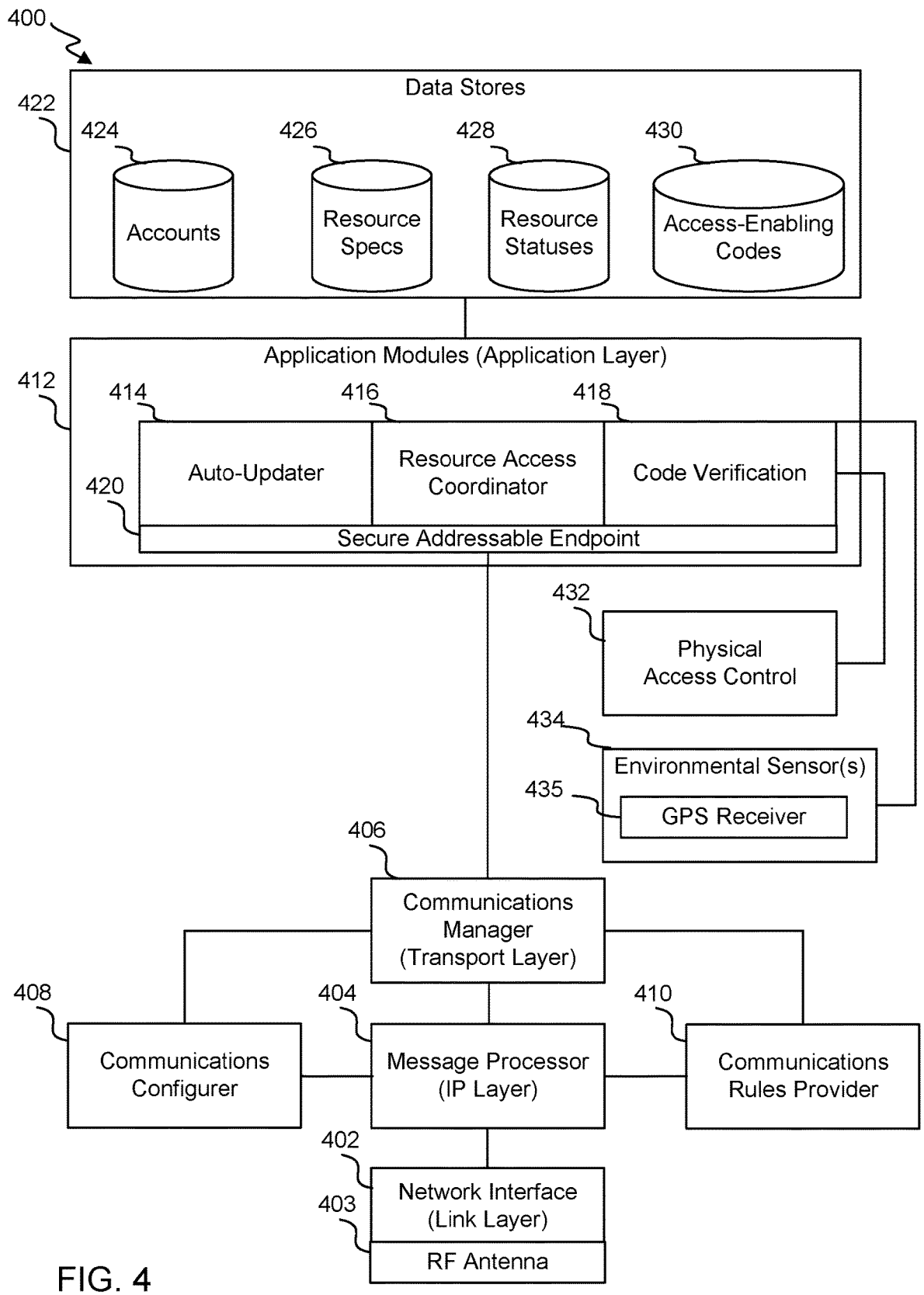
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a sporting event or concert). As another example, device 400 can transmit a signal that includes an access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), purchase data (e.g., reflecting dates, prices and/or items of past purchases) and/or payment data (e.g., credit card number and expiration date or payment account information). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a venue of the event and/or a set of seats (e.g., a chart or list). Specification data can further identify, for example, a cost for each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for tickets to a particular event can be unique relative to each other. In some instances, at least part of a code identifies a resource or specification of a resource. For example, for a ticket to a concert, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular ticket with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
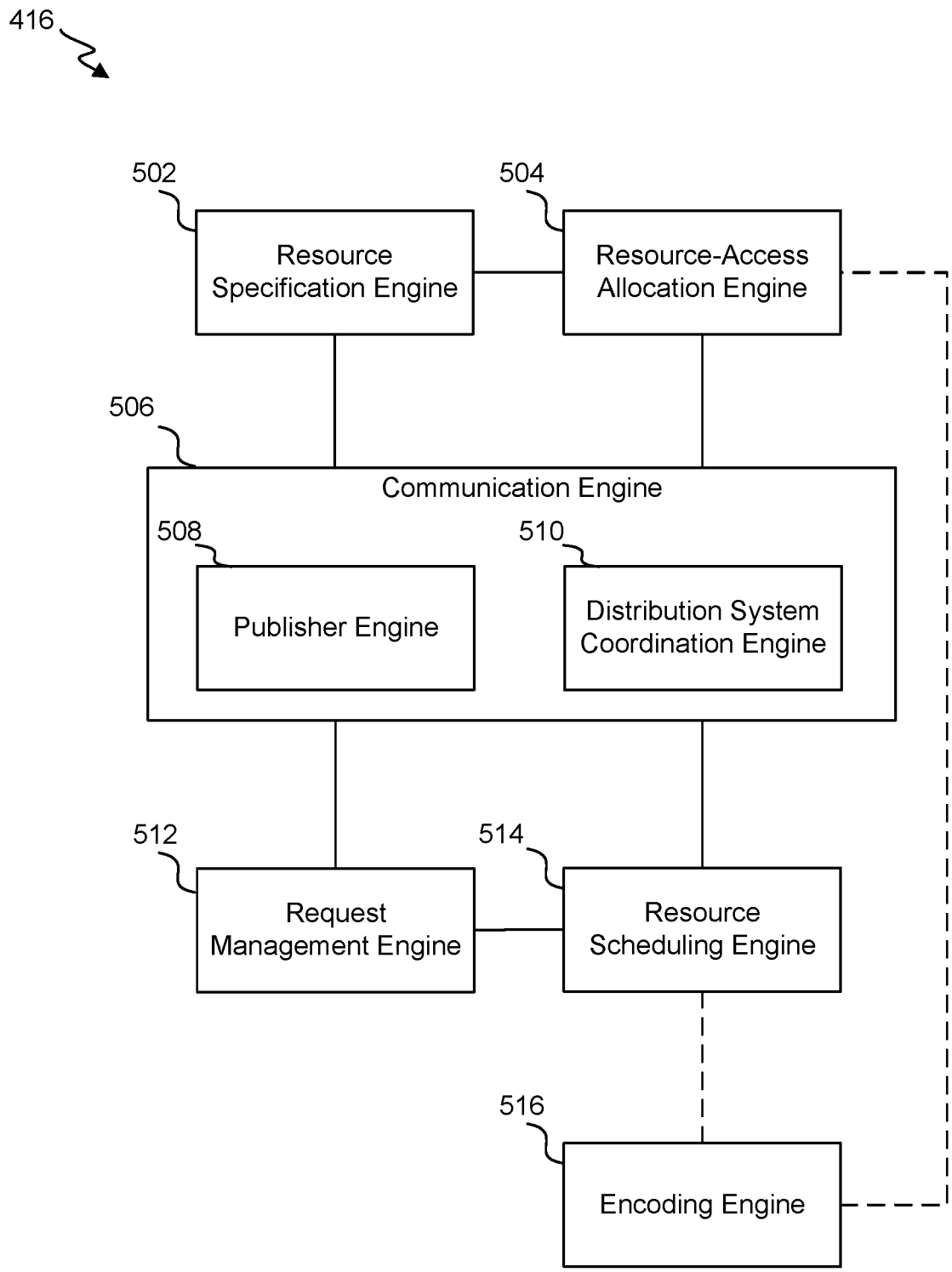
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on fee payment or authorization thereof, an allocated access right can be initially unassociated with particular entities (e.g., users). For example, an allocated right can correspond to one or more access characteristics, such as an processor identifier, a usage time, a memory allocation, a geographic location (e.g., section or seat identifier), and/or a fee. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights for seats in Section 1 may be provided for a first intermediate system to assign, and access rights for seats in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request management engine 512 can also or alternatively collect payment information, determine that payment information has been received, obtain authorization of payment, determine that payment has been authorized (e.g., via an intermediate system), collect payment, and/or determine that payment has been collected. For example, publisher engine 508 may receive a credit card number and expiration date via a webpage, and request management engine 512 can request authorization for an amount of the requested access rights. In some instances, payment assessments are performed subsequent to at least temporary assignments of access rights. In some instances, request management engine 512 retrieves data from a user account. For example, publisher engine 508 may indicate that a request for an access right has been received while a user was logged into a particular account. Request management engine 512 may then retrieve, for example, contact information, device information, and/or preferences and/or payment information associated with the account from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, purchase history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining payment authorization and/or user confirmation) and/or to change a status of the access right(s) to indicate that they have been assigned (e.g., immediately, upon receiving payment authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a ticket document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc., can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

In yet another example, the user may send a private code that is also used to create an access enabling code. The private code can be a user selected code or a digital signature. The private code can also be related to digitized user biometric data such as a facial image, finger print, voice print, or retina scan. One of skill in the art will recognize that any biometric identifier that can be digitized can be used. In this embodiment—the digital signature adds an additional layer of protection to avoid multiple use of the access-enabling codes.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
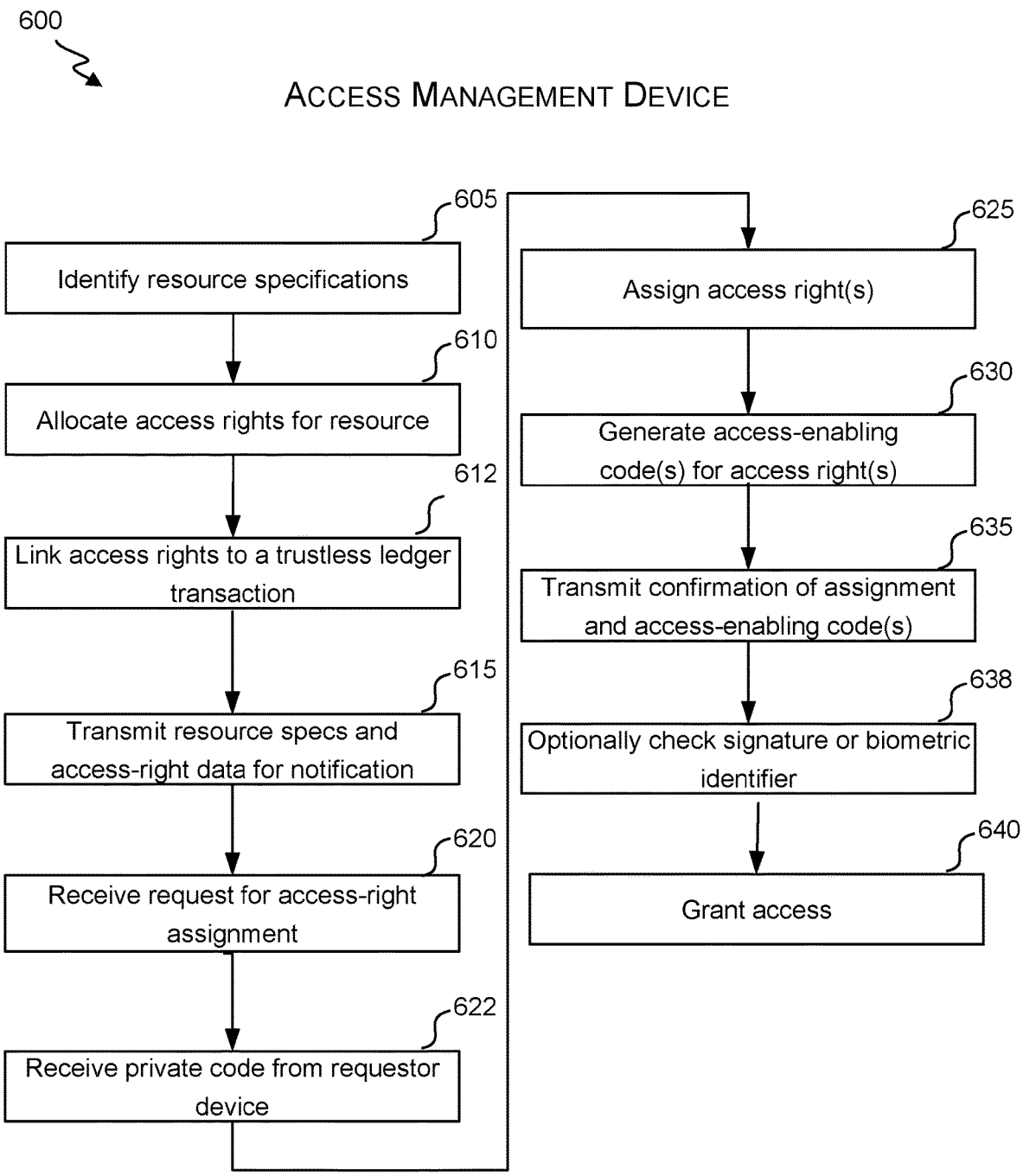
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 612, encoding engine 516 links the access rights to a trustless database computation. In one embodiment, a resource is linked to a colored bitcoin that is layered on top of a bitcoin computation. One of skill in the art will recognize that any manner of trustless databases can be used to track the computation including trustless databases using access tokens or access token identifiers. The trustless database contains all of the previous computation on the bitcoin chain. The operation of the trustless database and the blocks in the block chain will be further discussed in FIG. 9.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization. At block 622 the communication engine 506 receives a private code from a requester device. The private code is private to the requestor and can be self-selected or a signature or a digital biometric identifier such as a facial image, fingerprint, voice print, or retina scan.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

At block 638, request management engine 512 can optionally require the access enabling codes holder to present a signature in addition to the access-enabling codes to fully access the resource. For example, the holder could be required to provide a signature or give a biometric verification such as a facial scan for a facial image, a digital fingerprint, a digital voice print, or a retina scan. This would provide an additional screening mechanism to prevent the fraudulent transfer of the access-enabling codes to more than one party. At block 640 access to the resource is granted to the access-enabling code holder.

Figure 7:
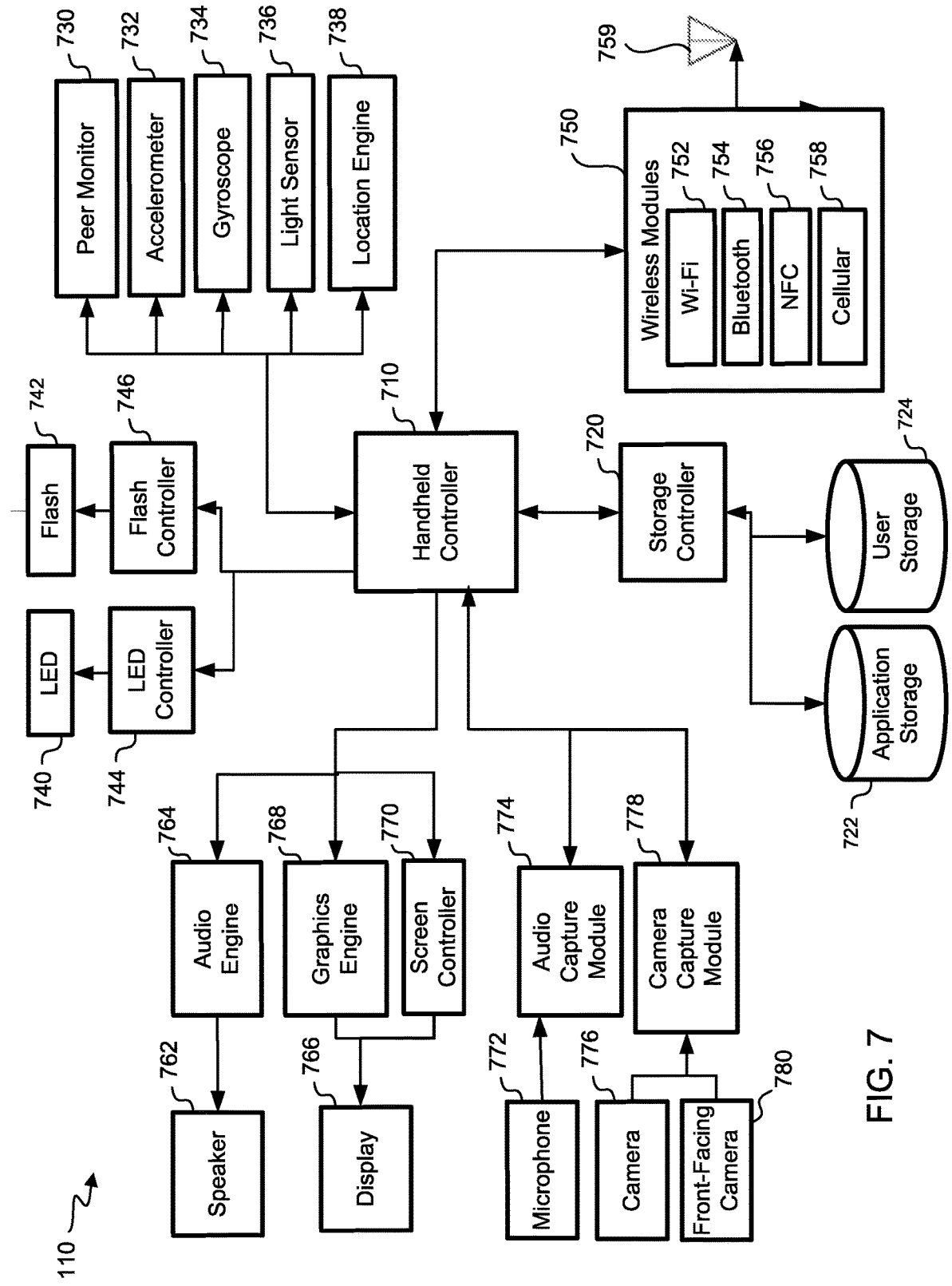
FIG. 7 shows a block diagram of user device according to an embodiment.

FIG. 7 shows a block diagram of user device 110 according to an embodiment. User device 110 includes a handheld controller 710 that can be sized and shaped so as enable the controller and user device 110 in a hand. Handheld controller 710 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 710 can communicate with a storage controller 720 so as to facilitate local storage and/or retrieval of data. It will be appreciated that handheld controller 710 can further facilitate storage and/or retrieval of data at a remote source via generation of communications including the data (e.g., with a storage instruction) and/or requesting particular data.

Storage controller 720 can be configured to write and/or read data from one or more data stores, such as an application storage 722 and/or a user storage 724. The one or more data stores can include, for example, a random access memory (RAM), dynamic random access memory (DRAM), read-only memory (ROM), flash-ROM, cache, storage chip, and/or removable memory. Application storage 722 can include various types of application data for each of one or more applications loaded (e.g., downloaded or pre-installed) onto user device 110. For example, application data can include application code, settings, profile data, databases, session data, history, cookies and/or cache data. User storage 724 can include, for example, files, documents, images, videos, voice recordings and/or audio. It will be appreciated that user device 110 can also include other types of storage and/or stored data, such as code, files and data for an operating system configured for execution on user device 110.

Handheld controller 710 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 7 shows several exemplary sensors and detection engines, including a peer monitor 730, accelerometer 732, gyroscope 734, light sensor 736 and location engine 738. Each sensor and/or detection engine can be configured to collect a measurement or make a determination, for example, at routine intervals or times and/or upon receiving a corresponding request (e.g., from a processor executing an application code).

Peer monitor 730 can monitor communications, networks, radio signals, short-range signals, etc., which can be received by a receiver of user device 110) Peer monitor 730 can, for example, detect a short-range communication from another device and/or use a network multicast or broadcast to request identification of nearby devices. Upon or while detecting another device, peer monitor 730 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 732 can be configured to detect a proper acceleration of user device 110. The acceleration may include multiple components associated with various axes and/or a total acceleration. Gyroscope 734 can be configured to detect one or more orientations (e.g., via detection of angular velocity) of user device 110. Gyroscope 734 can include, for example, one or more spinning wheels or discs, single- or multi-axis (e.g., three-axis) MEMS-based gyroscopes.

Light sensor 736 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 738 can be configured to detect (e.g., estimate) a location of user device 110. For example, location engine 738 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 738 can process signals from multiple sources and can estimate a location of user device 110 using a triangulation technique. In some instances, location engine 738 can process a single signal and estimate its location as being the same as a location of a source of the signal.

User device 110 can include a flash 742 and flash controller 746. Flash 742 can include a light source, such as (for example), an LED, electronic flash or high-speed flash. Flash controller 746 can be configured to control when flash 742 emits light. In some instances, the determination includes identifying an ambient light level (e.g., via data received from light sensor 736) and determining that flash 742 is to emit light in response to a picture- or movie-initiating input when the light level is below a defined threshold (e.g., when a setting is in an auto-flash mode). In some additional or alternative instances, the determination includes determining that flash 746 is, or is not, to emit light in accordance with a flash on/off setting. When it is determined that flash 746 is to emit light, flash controller 746 can be configured to control a timing of the light so as to coincide, for example, with a time (or right before) at which a picture or video is taken.

User device 110 can also include an LED 740 and LED controller 744. LED controller 744 can be configured to control when LED 740 emits light. The light emission may be indicative of an event, such as whether a message has been received, a request has been processed, an initial access time has passed, etc.

Flash controller 746 can control whether flash 746 emits light via controlling a circuit so as to complete a circuit between a power source and flash 746 when flash 742 is to emit light. In some instances, flash controller 746 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 750 configured to appropriately facilitate transmission or receipt of wireless signals of a particular type. Wireless modules 750 can include a Wi-Fi module 752, Bluetooth module 754, near-field communication (NFC) module 756 and/or cellular module 756. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 754 can be configured to generate and/or process radio signals with a frequency between 2.4 gigahertz and 5 gigahertz. Wi-Fi module 754 can include a wireless network interface card that includes circuitry to facilitate communicating using a particular standard (e.g., physical and/or link layer standard).

Bluetooth module 754 can be configured to generate and/or process radio signals with a frequency between 2.4 gigahertz and 2.485 gigahertz. In some instances, bluetooth module 754 can be configured to generate and/or process Bluetooth low-energy (BLE or BTLE) signals with a frequency between 2.4 gigahertz and 2.485 gigahertz.

NFC module 756 can be configured to generate and/or process radio signals with a frequency of 13.56 megahertz. NFC module 756 can include an inductor and/or can interact with one or more loop antenna.

Cellular module 758 can be configured to generate and/or process cellular signals at ultra-high frequencies (e.g., between 698 and 2690 megahertz). For example, cellular module 758 can be configured to generate uplink signals and/or to process received downlink signals.

The signals generated by wireless modules 750 can be transmitted to one or more other devices (or broadcast) by one or more antennas 759. The signals processed by wireless modules 750 can include those received by one or more antennas 759. One or more antennas 759 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 762 can be configured to present an audio output by converting an electrical signal into an audio signal. An audio engine 764 can effect particular audio characteristics, such as a volume, event-to-audio-signal mapping and/or whether an audio signal is to be avoided due to a silencing mode (e.g., a vibrate or do-not-disturb mode set at the device).

Further, a display 766 can be configured to present a visual output by converting an electrical signal into a light signal. Display 766 may include multiple pixels, each of which may be individually controllable, such that an intensity and/or color of each pixel can be independently controlled. Display 766 can include, for example, an LED- or LCD-based display.

A graphics engine 768 can determine a mapping of electronic image data to pixel variables on a screen of user device 110. It can further adjust lighting, texture and color characteristics in accordance with, for example, user settings.

In some instances, display 766 is a touchscreen display (e.g., a resistive or capacitive touchscreen) and is thus both an input and an output component. A screen controller 770 can be configured to detect whether, where and/or how (e.g., a force of) a user touched display 766. The determination may be made based on an analysis of capacitive or resistive data.

An input component can be configured to receive input from a user that can be translated into data. For example, as illustrated in FIG. 7, user device 110 can include a microphone 772 that can capture audio data and transform the audio signals into electrical signals. An audio capture module 774 can determine, for example, when an audio signal is to be collected and/or any filter, equalization, noise gate, compression and/or clipper that is to be applied to the signal.

User device 110 can further include one or more cameras 776, 780, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 776 and a front-facing camera 780.

A camera capture module 778 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 778 may further determine which camera(s) is to collect image data (e.g., based on a setting).

Various aspects of a client agent device, client register, client point device or access management system may be implemented to make use of a distributed database, for example, a decentralized virtual trustless database that tracks valid access rights, such as by exchanging data communications with a system that includes or otherwise has access to the distributed database. It will be appreciated that various implementations of a distributed database exist. All or portions of a distributed database may exist in any two or more of user devices 210, management systems 214, 216, 222, etc., as well as other systems not illustrated in the accompanying figures.

Although it may seem counter intuitive, in embodiments, a distributed database that is distributed among or used by many users may be more trustworthy than a database that is controlled by only one or distributed among a few users. This may be due to a multi-party validation effect, where changes made to the database can be propagated amongst users and then later verified by any user. In a database controlled by one or only distributed among a few users, the database may be changed maliciously by a compromised user or through user collusion, for example, which can result in the potential for elimination of valid access rights and creation of access rights that are not legitimate.

In this way, it is advantageous to make use of a distributed database that is in wide use by many users to track valid access rights. Although not so limited, an exemplary distributed database that is used by a large number of users is a cryptocurrency block chain, such as the Bitcoin block chain.

A block chain may refer to a distributed database that has been used for tracking creation and transfers of cryptocurrency elements, such as Bitcoin. A block chain, for example, may correspond to a growing list of blocks representing new creation of cryptocurrency elements as well as computations representing transfers of amounts of the cryptocurrency. Each cryptocurrency element is associated with an address to which it is assigned. Assignment, as used here, may also correspond to ownership, control or the ability to transfer a cryptocurrency element to another address.

Each address associated with a cryptocurrency element may correspond to a public key of a public-private key pair. Only a user possessing the corresponding private key may transfer the cryptocurrency element associated with the address to another address. Thus a user possessing a private key may be said to be in control of, or own, a particular cryptocurrency element associated with the corresponding public key/address.

On the full block chain, each and every cryptocurrency element and all transfers of all cryptocurrency elements ever made are accounted for, allowing verification of which addresses control which cryptocurrency elements at any given moment. Since the addresses may correspond, at least in part, to a public key, the identity of the user controlling the associated cryptocurrency elements may be masked unless a user shows they are in possession of the corresponding private key, which may occur, for example, by using the corresponding private key to transfer the cryptocurrency element associated with the address to another address.

As new blocks are created and computations added to the block chain, the size of the block chain increases. Each new block created references one and only one other block—the previous block. Since it is possible to create different blocks that reference the same previous block, forks in the chain are possible. To accommodate this issue, the block chain that contains the longest sequence (or largest total difficulty) of blocks is typically regarded as authoritative.

Figure 8:
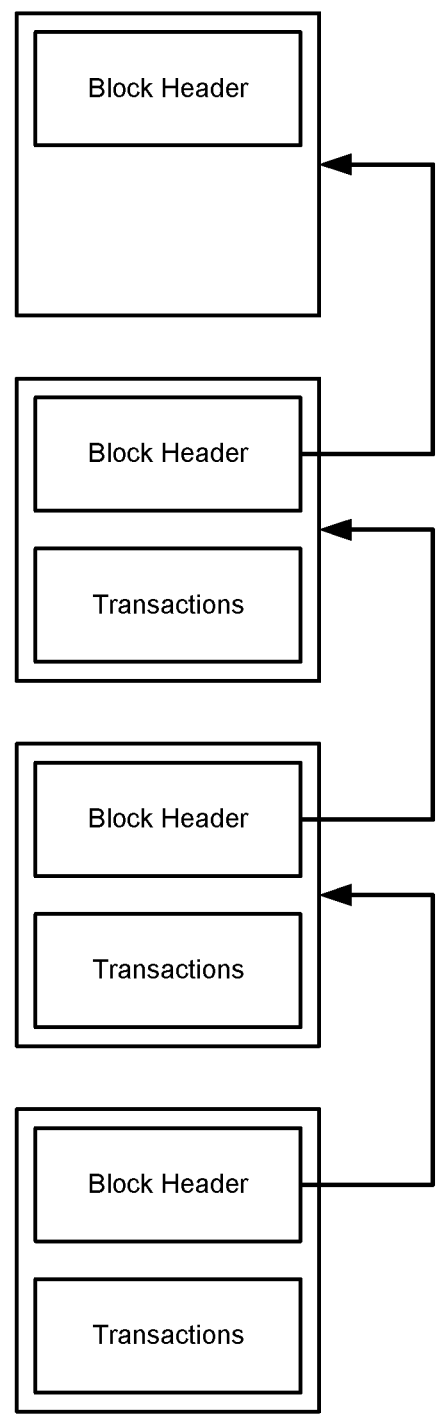
FIG. 8 shows a schematic illustration of a block chain.

FIG. 8 provides a schematic illustration of a cryptocurrency block chain. Each block includes a block header that references the previous block, except for the "genesis" block which is the first block in the chain. Each block may also include computations that correspond to transfer of cryptocurrency elements to other addresses. It will be appreciated that multiple unrelated computations may be included in the computations of a single block.

Figure 9:
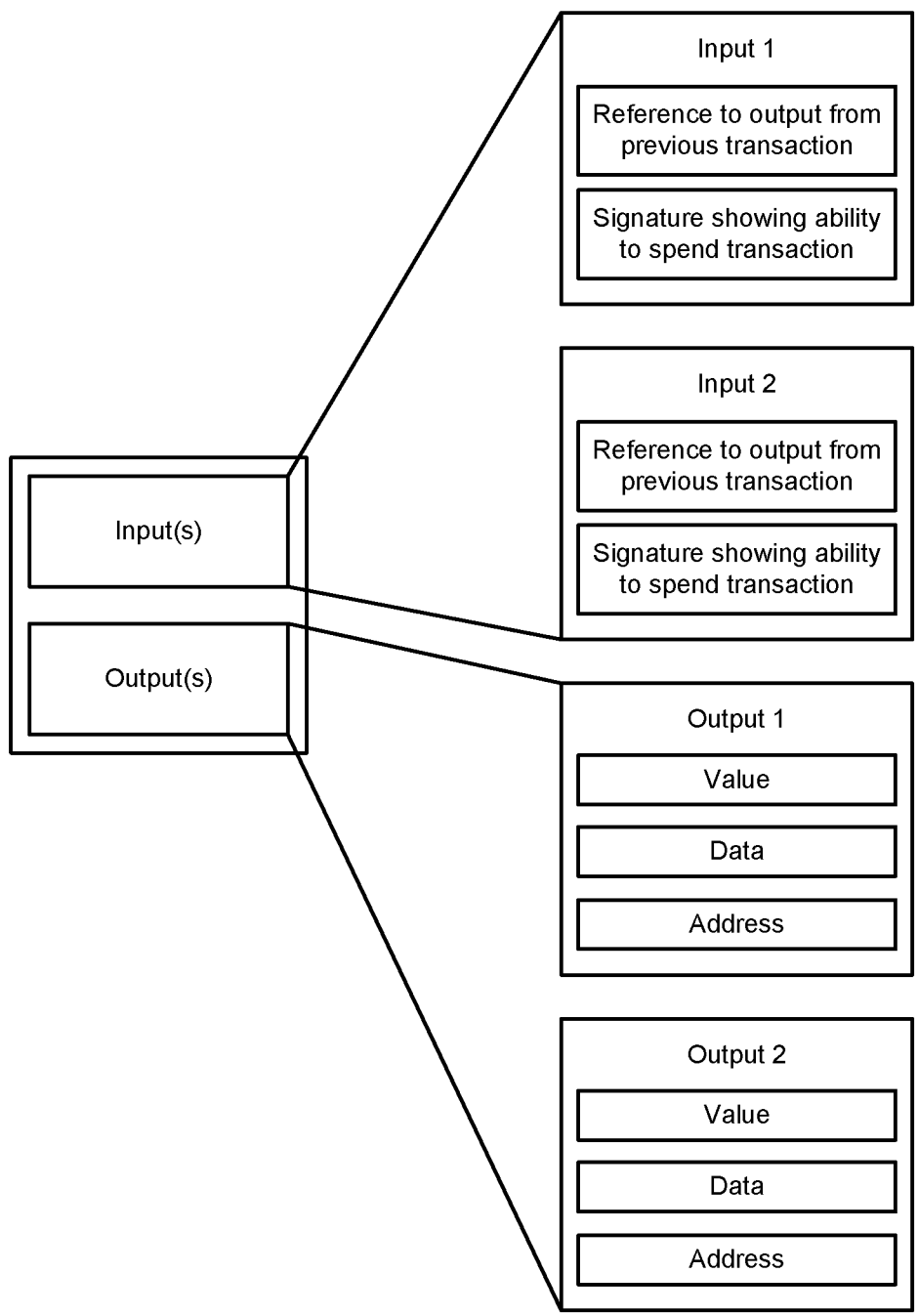
FIG. 9 shows a schematic illustration of a computation included in a block of a block chain.

FIG. 9 provides a schematic illustration of a cryptocurrency computation including two inputs and two outputs. In general, each computation includes one or more input elements and one or more output elements, though two of each are illustrated here for purposes of indicating that there can be multiples of each. Each input element includes a reference to one or more output elements from a previous computation and a signature showing the ability to transfer the previous computation. Each output element includes a cryptocurrency amount (value) to be transferred and an address to transfer the value to. It will be appreciated that the signature included in the input element may be used to prove that the computation in the referenced output element is being transferred by the real owner of the address listed in the referenced output element.

Additional data may also be included in the computation, as will be discussed below, which may be used, for example, to identify or authenticate ownership of a particular access right. The total output values, plus any computation fee, in a computation must be equal to the total of the referenced outputs in the input portions of the computation. The computation fee, if any, may be awarded to the user that generates the next block in the block chain that includes the computation.

As the block chain grows with each and every transfer and new block added to the block chain, the block chain may become large in size. Changes to the block chain may represent new additions (blocks and computations) and so propagation of changes instead of the full block chain may minimize the total amount of data needed to maintain a current copy of the block chain, provided an initial full copy of the block chain was or is available. In this way, the block chain is distributed and not maintained by any single central authority.

In addition, additional data may be included with elements of the cryptocurrency, as added by an output element of a computation. Cryptocurrency elements including additional data of this nature may be referred to as "colored cryptocurrency," for example a "colored bitcoin." The additional data may correspond, for example, to an access token or access token identifying ownership of an asset, or a promise by the issuer to redeem the cryptocurrency element including the additional data for the asset. Various assets may be identified by or correspond to a colored cryptocurrency element, such as a financial asset, a physical asset, or an access right. Other uses of colored cryptocurrency are possible.

In exemplary embodiments, a colored cryptocurrency element may correspond to an access right or an access-enabling code. For example, in one embodiment, a user being in possession the private key needed to transfer a colored cryptocurrency element may be an indicator that the user has a valid access right for a particular restricted access area. In some instances, verification of a user possessing an access right may be established by confirming the user is in possession of the corresponding private key.

Since a private key is a piece of data, it may be represented in digital form (i.e., a computer readable file) or in a physical form (i.e., a printout of characters or symbols (e.g., a barcode or quick response (QR) code) corresponding to the private key). In this way, multiple users may possess copies of the corresponding private key, whether in digital or physical form. Accordingly, each user possessing the private key may lay claim to a valid access right, which may be undesirable particularly when the access right is to be held by only a single user. This issue can be solved if the user is required to transfer the cryptocurrency element including the additional data that corresponds to the access right to an address controlled by a central authority, such as the access control system owner, in order to obtain entry to a restricted access area. In this way, once the transfer is made, the private key is no longer useful for controlling the cryptocurrency element because the cryptocurrency element is now controlled by the new address the cryptocurrency element has been transferred to. Moreover, the central authority can confirm they possess the new private key that controls the transferred cryptocurrency element corresponding to the new address the cryptocurrency element has been transferred to.

It will be appreciated that each cryptocurrency element associated with an address can, in normal circumstances, only be transferred one time by that address—that is, it cannot be "double spent." This occurs because cryptocurrency transfers are irreversible and are verified by multiple users of the block chain as new blocks are created. Upon transfer, details of the transfer will be added to the block chain with the next block created.

However, since it may take time to create new blocks, there is a possibility that a user may attempt to transfer a cryptocurrency element multiple times or that multiple users possessing the appropriate private key will attempt to transfer the cryptocurrency element before creation of a new block that includes the first transfer. It will be appreciated that the current approximate time for creation of a new block on the Bitcoin block chain is about 10 minutes. Thus, there is a small time window during which a user may have an opportunity to attempt to transfer the cryptocurrency element multiple times before the transfer is added to the block chain and can be confirmed by multiple users of the block chain.

In order to overcome this concern, embodiments implement a centralized access-control database. Such a system allows for use of a cryptocurrency block chain to provide for use of a colored cryptocurrency element that represents a particular access-right and minimize or eliminate the possibility of multiple uses of the access-right.

The initial use of the access-right may correspond with a first transfer of the colored cryptocurrency element by a user to the access-control system owner. The access-control system owner may then change a value in the centralized access-control database indicating that the access-right has been used and is unavailable for use by another user and grant access to the user. Even if a second user attempting to use the same colored cryptocurrency element is able to transfer the colored cryptocurrency element to the access-control system owner during the time window before the block chain is updated, the centralized access-control will indicate that the corresponding access-right is unavailable for use and so the second user will be denied access.

Data exchanges may take place between a client device at which access to the user is granted, such as a data communication providing details of the colored cryptocurrency element being used by the user. The user must also initiate a computation representing the transfer of the cryptocurrency element, which may occur using a device possessed by the user, such as a digital wallet application. The centralized access control system may receive a list of all valid colored cryptocurrency elements issued for access at various access control points. If it is desired for the user to exit the restricted access area and be eligible for re-entry, the same or another colored cryptocurrency element may be transferred to the user upon exit and the centralized access control database may be altered to reflect that this colored cryptocurrency element is eligible for use for granting access.

Other advantages may achieved using the system and techniques described herein. For example, a user may be able to verify whether a colored cryptocurrency element was created or authorized by the access control system by analyzing the block chain to determine when and by which address the colored cryptocurrency element was created. Further, multiple access control designees could be assigned authority to issue, create or transfer colored cryptocurrency elements, thus relaxing the requirement to have only one central authority. Additionally, because all creation and transfers of the colored cryptocurrency elements are tracked on the block chain, it is possible to use time based limitations on when the colored cryptocurrency elements may be transferred. For instance, the colored cryptocurrency exchanges could be barred starting 10 or minutes before a venue for a resource has opened for that resource. This type of time bar would prevent multiple parties with the same access-enabling code from trying to take advantage of the 10 minute gap in time to process a colored cryptocurrency exchange.

As another example, a user may be able to transfer the access right represented by the colored cryptocurrency element to another user, such as may occur in the usual way of transferring a cryptocurrency element from one address to another. This may allow users to freely exchange or transfer access rights. Optionally, transfers between users may be disallowed by the access control system owner. Optionally, transfers between users may be permitted by the access control system owner but only if the access control system owner is involved as an intermediary party to the computation, such as in a two-step transfer process where the first user transfers the colored cryptocurrency element to an address controlled by the access control system owner followed by another transfer from the address controlled by the access control system owner to an address controlled by the second user.

Again, because the block chain allows for tracking of all transfers of the colored cryptocurrency elements, it is possible to determine whether multiple colored cryptocurrency elements are controlled by a single address. In such a situation, it may be possible for the access control system to limit the utility of those colored cryptocurrency elements, such as if it is determined that the address is associated with a malicious user or third party for which access to a restricted area may be undesirable.

It will be appreciated that in some embodiments, transfer of the colored cryptocurrency element is not required. For example, this may be useful in embodiments where additional authentication credentials or techniques are used in addition to possessing control over a colored cryptocurrency element, similar to a dual-factor authentication system. For example, additional identity verification, such as a conventional access control token, a biometric challenge, photo identification verification, etc., may be required before access to a restricted zone is permitted. Such a system is useful since it is possible to verify ownership or control over a particular cryptocurrency element though use of public-private key cryptography. For example, a message signed with the private key corresponding to the address to which a particular colored cryptocurrency element is assigned can be verified using the address and/or corresponding public key. In this way, ownership/control can be verified without having to transfer the colored cryptocurrency element.

The present application is related to the following co-pending and commonly assigned PCT Application No. PCT/US17/16258 (Attorney Docket Number 095001-1038017 (005310PC)) filed Feb. 2, 2017, the entire contents of which are incorporated by reference herein.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc., can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed:

1. A distributed virtual trustless ledger based access control system for controlling access to restricted access areas comprising:
   a processor based resource access coordinator that performs actions of:
      defining one or more specifications for an event, wherein the event is related to a restricted access area, and wherein a valid electronic ticket enables entry into the restricted access area;
      allocating an electronic ticket for the event based on the one or more specifications;
      linking the electronic ticket for the event to a first trustless ledger transaction;
      publishing the electronic ticket for the event;
      using a second trustless ledger transaction, wherein the second trustless ledger transaction includes information from the first trustless ledger transaction:
      assigning the electronic ticket for the event to a requestor, wherein the assignment of the electronic ticket to the requestor enables the requestor to control a private access key associated with the electronic ticket, and wherein the private access key enables the requestor to transfer the electronic ticket;
      tracking a first assignment of the electronic ticket, wherein the first assignment transfers the electronic ticket from the requestor to an additional requestor, wherein the first assignment of the electronic ticket includes linking the electronic ticket for the event to the second trustless ledger transaction, wherein linking the electronic ticket to the second trustless ledger transaction corresponds to tracking ownership of the electronic ticket, and wherein completing the first assignment causes the private access key to no longer enable the requestor to access the electronic ticket and the additional requestor to be enabled to transfer the electronic ticket;
      generating an access-enabling code for the electronic ticket using a private code; and
      granting access to the restricted access area upon presentation of the access- enabling code at an entry point of the restricted access area.

2. The distributed virtual trustless ledger of claim 1, further comprising:
   one or more servers that perform the actions of:
      receiving a request for the electronic ticket for the event from a requester device;
      receiving the private code from the requester device;
      transmitting a confirmation of assignment for the electronic ticket to the requester device; and
      transmitting the access-enabling code to the requester device.

3. The distributed virtual trustless ledger of claim 1, wherein the processor further performs the actions of:
   detecting that a requestor device is within a threshold distance from a geofence perimeter or the entry point of the restricted access area; and
   in response to detecting that the requestor device is within the threshold distance, automatically:
      retrieving the access-enabling code from the requestor device;
      performing a verification analysis of the access-enabling code; and
      presenting an indicator identifying whether access is to be granted or limited based on a result of the verification analysis.

4. The distributed virtual trustless ledger of claim 3, wherein performing the verification analysis of the access-enabling code includes:
   querying a data store for an entry associated with the access-enabling code;
   modifying the entry to identify that the access-enabling code has been used; and
   generating the result of the verification analysis indicating that the access-enabling code is verified.

5. The distributed virtual trustless ledger of claim 3, wherein performing the verification analysis of the access-enabling code includes:
   querying a data store for an entry associated with the access-enabling code; and
   generating the result of the verification analysis indicating that the access-enabling code is not verified.

6. The distributed virtual trustless ledger of claim 1, wherein the second trustless ledger transaction uses information from the first trustless ledger transaction and a private code associated with the requestor, and wherein the private code is based on digital biometric information associated with the requestor.

7. The distributed virtual trustless ledger of claim 1, wherein the processor further performs the actions of:
   assigning the electronic ticket for the event to a second requestor, wherein assigning the electronic ticket includes linking the electronic ticket for the event to a third trustless ledger transaction, wherein the third trustless ledger transaction uses information from the second trustless ledger transaction, and wherein the first trustless ledger transaction, the second trustless ledger transaction, and the third trustless ledger transaction correspond to cryptocurrency transactions.

8. A computer-implemented method comprising:
defining one or more specifications for an event, wherein the event is related to a restricted access area, and wherein a valid electronic ticket enables entry into the restricted access area;
allocating an electronic ticket for the event based on the one or more specifications;
linking the electronic ticket for the event to a first trustless ledger transaction;
publishing the electronic ticket for the event;
using a second trustless ledger transaction, wherein the second trustless ledger transaction includes information from the first trustless ledger transaction:
assigning the electronic ticket for the event to a requestor, wherein the assignment of the electronic ticket to the requestor enables the requestor to control a private access key associated with the electronic ticket, and wherein the private access key enables the requestor to transfer the electronic ticket;
tracking a first assignment of the electronic ticket wherein the first assignment transfers the electronic ticket from the requestor to an additional requestor, wherein the first assignment of the electronic ticket includes linking the electronic ticket for the event to the second trustless ledger transaction, wherein linking the electronic ticket to the second trustless ledger transaction corresponds to tracking ownership of the electronic ticket, and wherein completing the first assignment causes the private access key to no longer enable the requestor to access the electronic ticket and the additional requestor to be enabled to transfer the electronic ticket;
generating an access-enabling code for the electronic ticket using a private code; and
granting access to the restricted access area upon presentation of the access-enabling code at an entry point of the restricted access area.

9. The computer-implemented method of claim 8, further comprising:
receiving a request for the electronic ticket for the event from a requester device;
receiving the private code from the requester device;
transmitting a confirmation of assignment for the electronic ticket to the requester device; and
transmitting the access-enabling code to the requester device.

10. The computer-implemented method of claim 8, further comprising:
detecting that a requestor device is within a threshold distance from a geofence perimeter or the entry point of the restricted access area; and
in response to detecting that the requestor device is within the threshold distance, automatically:
retrieving the access-enabling code from the requestor device;
performing a verification analysis of the access-enabling code; and
presenting an indicator identifying whether access is to be granted or limited based on a result of the verification analysis.

11. The computer-implemented method of claim 10, wherein performing the verification analysis of the access-enabling code includes:
querying a data store for an entry associated with the access-enabling code;
modifying the entry to identify that the access-enabling code has been used; and
generating the result of the verification analysis indicating that the access-enabling code is verified.

12. The computer-implemented method of claim 10, wherein performing the verification analysis of the access-enabling code includes:
querying a data store for an entry associated with the access-enabling code; and
generating the result of the verification analysis indicating that the access-enabling code is not verified.

13. The computer-implemented method of claim 8, wherein the second trustless ledger transaction uses information from the first trustless ledger transaction and a private code associated with the requestor, and wherein the private code is based on digital biometric information associated with the requestor.

14. The computer-implemented method of claim 8, further comprising:
assigning the electronic ticket for the event to a second requestor, wherein assigning the electronic ticket includes linking the electronic ticket for the event to a third trustless ledger transaction, wherein the third trustless ledger transaction uses information from the second trustless ledger transaction, and wherein the first trustless ledger transaction, the second trustless ledger transaction, and the third trustless ledger transaction correspond to cryptocurrency transactions.

15. A computer program product, comprising:
a non-transitory computer readable storage medium including instructions that, when executed by one or more processors, cause the one or more processors to perform operations including:
defining one or more specifications for an event, wherein the event is related to a restricted access area, and wherein a valid electronic ticket enables entry into the restricted access area;
allocating an electronic ticket for the event based on the one or more specifications;
linking the electronic ticket for the event to a first trustless ledger transaction;
publishing the electronic ticket for the event;
using a second trustless ledger transaction, wherein the second trustless ledger transaction includes information from the first trustless ledger transaction:
assigning the electronic ticket for the event to a requestor, wherein the assignment of the electronic ticket to the requestor enables the requestor to control a private access key associated with the electronic ticket, and wherein the private access key enables the requestor to transfer the electronic ticket;
tracking a first assignment of the electronic ticket, wherein the first assignment transfers the electronic ticket from the requestor to an additional requestor, wherein the first assignment of the electronic ticket includes linking the electronic ticket for the event to the second trustless ledger transaction, wherein linking the electronic ticket to the second trustless ledger transaction corresponds to tracking ownership of the electronic ticket, and wherein completing the first assignment causes the private access key to no longer enable the requestor to access the electronic ticket and the additional requestor to be enabled to transfer the electronic ticket;
generating an access-enabling code for the electronic ticket using a private code; and granting access to the restricted access area upon presentation of the access- enabling code at an entry point of the restricted access area.

16. The computer program product of claim 15, wherein the operations further comprise:
receiving a request for the electronic ticket for the event from a requester device;
receiving the private code from the requester device;
transmitting a confirmation of assignment for the electronic ticket to the requester device; and
transmitting the access-enabling code to the requester device.

17. The computer program product of claim 15, wherein the operations further comprise:
detecting that a requestor device is within a threshold distance from a geofence perimeter or the entry point of the restricted access area; and
in response to detecting that the requestor device is within the threshold distance, automatically:
retrieving the access-enabling code from the requestor device;
performing a verification analysis of the access-enabling code; and
presenting an indicator identifying whether access is to be granted or limited based on a result of the verification analysis.

18. The computer program product of claim 17, wherein the operations further comprise:
querying a data store for an entry associated with the access-enabling code;
modifying the entry to identify that the access-enabling code has been used; and
generating the result of the verification analysis indicating that the access-enabling code is verified.

19. The computer program product of claim 17, wherein the operations further comprise:
querying a data store for an entry associated with the access-enabling code; and
generating the result of the verification analysis indicating that the access-enabling code is not verified.

20. The computer program product of claim 15, wherein the second trustless ledger transaction uses information from the first trustless ledger transaction and a private code associated with the requestor, and wherein the private code is based on digital biometric information associated with the requestor.

* * * * *